US012675176B2

(12) United States Patent　　　(10) Patent No.:　US 12,675,176 B2
　　Zielonka　　　　　　　　　　　　(45) Date of Patent:　　　Jul. 7, 2026

(54) INPUT DEVICE

(71) Applicant: C. JOSEF LAMY GMBH, Heidelberg (DE)

(72) Inventor: Sebastian Zielonka, Viernheim (DE)

(73) Assignee: C. JOSEF LAMY GMBH, Heidelberg (DE)

( * ) Notice: Subject to any disclaimer, the term of this patent is extended or adjusted under 35 U.S.C. 154(b) by 0 days.

(21) Appl. No.: 19/098,128

(22) Filed: Apr. 2, 2025

(65) Prior Publication Data

US 2025/0315113 A1　　Oct. 9, 2025

(30) Foreign Application Priority Data

Apr. 5, 2024　(DE) ..................... 10 2024 109 649.7

(51) Int. Cl.
G06F 3/0354　　　(2013.01)
(52) U.S. Cl.
CPC ................................ G06F 3/03545 (2013.01)
(58) Field of Classification Search
CPC ....... G06F 3/03545; B43K 7/005; B43K 7/12; B43K 24/023
USPC ......................................................... 345/179
See application file for complete search history.

(56) References Cited

U.S. PATENT DOCUMENTS

| | | | |
|---|---|---|---|
| 240,712 A | 4/1881 | Hoffman | |
| 6,273,627 B1 | 8/2001 | Mittersinker et al. | |

| | | | | |
|---|---|---|---|---|
| 6,276,855 B1 * | 8/2001 | Hsien | ................... | B43K 24/082 |
| | | | | 401/109 |
| 7,077,594 B1 * | 7/2006 | Annerino | ........... | G06F 3/03545 |
| | | | | 16/427 |
| 8,087,841 B2 * | 1/2012 | Liu | ....................... | B43K 24/084 |
| | | | | 401/109 |
| 2008/0170048 A1 * | 7/2008 | Hua | ........................ | B43K 24/00 |
| | | | | 345/179 |
| 2009/0050378 A1 * | 2/2009 | Lee | ....................... | G06F 1/1626 |
| | | | | 178/19.01 |
| 2015/0261382 A1 | 9/2015 | Lin et al. | | |

FOREIGN PATENT DOCUMENTS

| | | | | | |
|---|---|---|---|---|---|
| CN | 118276692 A | * | 7/2024 | ......... | G06F 3/04162 |
| DE | 102016001281 A1 | * | 8/2017 | ......... | G06F 3/03545 |

* cited by examiner

*Primary Examiner* — Koosha Sharifi-Tafreshi
(74) *Attorney, Agent, or Firm* — Oliff PLC

(57)　　　　　　　ABSTRACT

An input device, in particular active or passive, which is intended for touch-sensitive screen and to the front end of which an input element, which can be placed on the screen, of a preferably elongate input part of the input device is assigned in order to make inputs. Input part is movably mounted so latter is movable from a housing position, wherein input element, preferably the entire input part, is located in housing of input device, into an input position, wherein input element is located outside the housing, in order to make inputs, and in that, in order to elongate input device, a further rearwardly arranged housing part of housing is movably mounted on a further forwardly arranged housing part of housing, so that further rearwardly arranged housing part is movable from a shortened position, wherein input device is shortened, into elongated position, wherein input device is elongated.

19 Claims, 1 Drawing Sheet

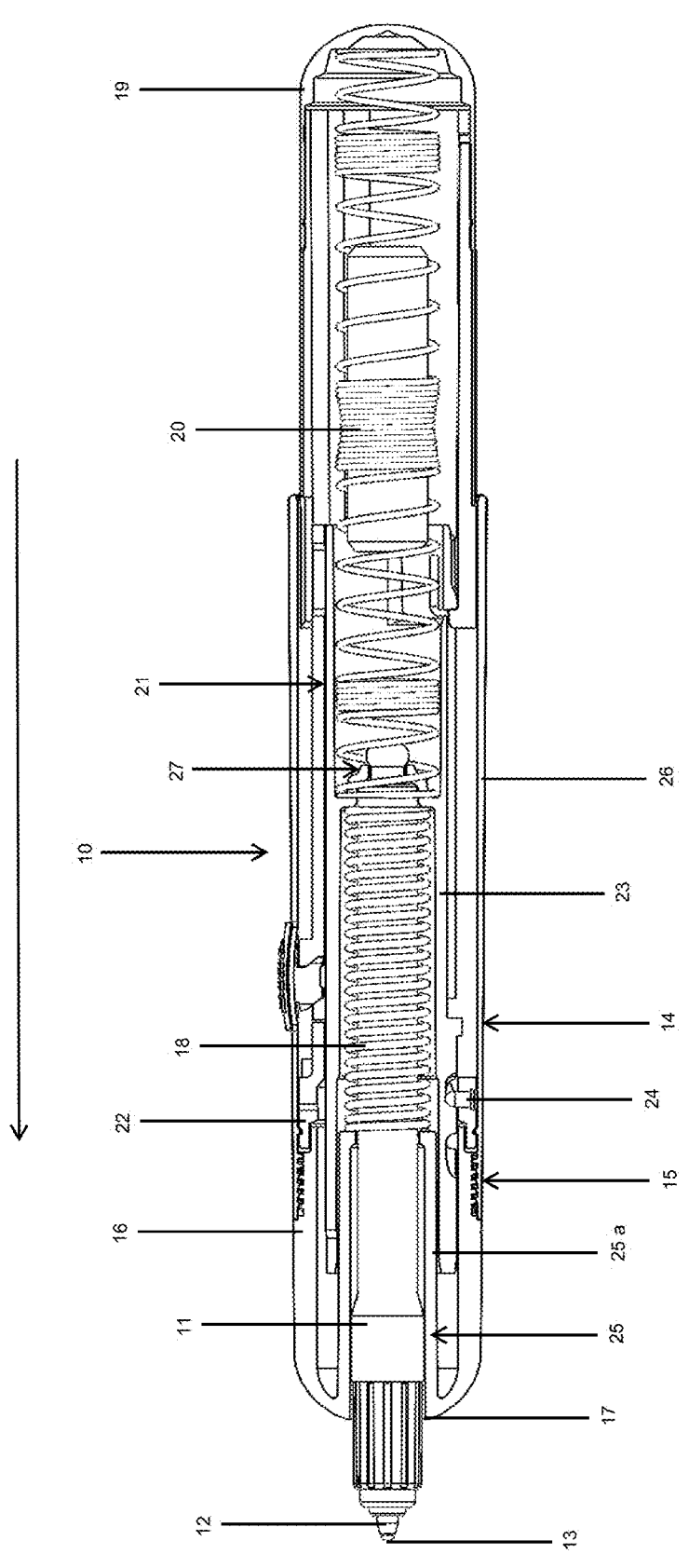

INPUT DEVICE

The present invention relates to an input device, in particular active or passive, which is intended for a touch-sensitive screen and to the front end of which an input element, which can be placed on the screen, of a preferably elongate input part of the input device is assigned in order to make inputs.

Input devices for touch-sensitive screens are known in a wide variety of forms. A drawback of these devices is, inter alia, that they generally have to be comparatively long so that an operator can grip them comfortably during operation. This length is often inconvenient when the respective input device is not in use and, for example, has to be transported. Another drawback often encountered with such input devices is that the tip or input element of the input device is generally unprotected during transport and can accordingly rapidly become damaged.

Proceeding from this prior art, it is an object of the present invention to further develop the input device mentioned at the beginning.

This object is achieved by an input device as claimed in claim 1.

Accordingly, an input device according to the invention is characterized in that the input part is movably mounted so that the latter is movable from a housing position, in which the input element, preferably the entire input part, is located in the housing of the input device, into an input position, in which the input element, which can be placed on the screen, is located outside the housing, in order to be able to make inputs therewith, wherein, in order to elongate the input device, a further rearwardly arranged housing part of the housing is movably mounted on a further forwardly arranged housing part of the housing, so that the further rearwardly arranged housing part is movable from a shortened position, in which the input device is shortened, into an elongated position, in which the input device is elongated.

In this manner, an input device is provided, the total length (from the front end of the input element to the rear end of the housing) of which can be increased in a phase in which it is in use in comparison with a phase in which it is not in use. In other words, the input device can be shortened in phases in which it is not in use, so that it is more convenient and simpler to transport. At the same time, in the shortened state of the input device, the input element of the movable input part is protected against collisions, etc. occurring for example during transport, since the input element is located in the housing of the input device in this state.

The input device may be an electromagnetic, electro-optical, EMR, capacitive, inductive or resistive stylus.

In a first alternative, the input device can therefore be constructed according to the invention as an active stylus or active input pen. In such a case, the input device may, generally speaking, preferably have an input element, in particular an electrically conductive input element, which is electrically connected to an electronic assembly in the interior of the housing of the input element and can actively interact with the touch-sensitive screen by means of technologies known in the prior art. Provision may be made, inter alia, for the energy required by the input device for this purpose to originate from the touch-sensitive screen or another external energy source. However, it is also conceivable that a battery, in particular a rechargeable battery, which supplies the electronic assembly with electrical energy, is located in the interior of the housing.

In a further alternative, the input device may accordingly be constructed as a passive stylus or passive input pen (without electronic components and/or a battery).

In the present document, a touch-sensitive screen is moreover understood to be any screen on which an interaction takes place and an input can be made when the input device is placed thereon. This also includes screens with which, as a result of the technology used, an interaction with the input device could even take place shortly before the latter is placed on the screen, such as screens based on EMR technology.

Preferably, according to a further aspect of the invention, provision may be made to arrange in the housing a spring element, in particular a spring element constructed as a tension or compression spring, with or against the spring force of which the input part is movable from the housing position into the input position.

The spring element may be arranged in the housing at a distance from the front, free end of the input device. Alternatively or additionally, the spring element may be arranged at a distance from a front opening of the housing, the input element being moved through this opening when the input part is moved from the housing position into the input position.

Provision may be made, when the input part is in the input position, for the front end of the spring element to be located at a distance of at least 15 mm from the front end of the input element, preferably at least 20 mm, particularly preferably at least 22 mm.

It has been found that, in particular in the event that the input device is an active stylus, in particular an EMR stylus, and the spring element is metallic, the aforementioned distance ensures that electromagnetic interference affecting the input element, constructed in particular as an EMR tip, is reduced or avoided.

In this context, with the exception of the input part, which may be entirely or partly constructed from metallic and/or non-metallic material, provision may also be made for all other components of the input device and/or the component portions of all other components of the input device which, when the input part is in the input position, are located in a region of at least up to 15 mm, preferably at least 20 mm, particularly preferably at least 22 mm, starting from the front end of the input element of the input part, to also be constructed from non-metallic material.

Provision may be made in particular for at least the cap-like housing part and/or the spring element and/or the spacer part to be constructed from non-metallic material.

In a further specific implementation of the concept according to the invention, the input device may have a control unit, which has at least one, preferably at least two, switching cams and with which the input part is movable both from the housing position into the input position and from the input position into the housing position.

Moreover, the input device may have a spring element, in particular a further spring element, the spring force of which allows the further rearwardly arranged housing part to be moved into the elongated position.

Provision may further be made for the further rearwardly arranged housing part to be a depressor which is operatively connected to the control unit and can be actuated in the same pressing direction, in particular against the spring force of the aforementioned spring element, to move the input part both into the input position and into the housing position.

Furthermore, the control unit may be constructed and operatively connected to the rear housing part in such a way that a single actuation of the rear housing part in the pressing direction moves the input part from the housing position into the input position and also moves the rear housing part from the shortened position into the elongated position.

The control unit may further have a switching sleeve, which is connected in particular to the housing in an axially fixed and rotationally engaged manner, and a cam part which cooperates with the switching sleeve, in particular a cam part which preferably has the at least one or the at least two switching cams of the control unit and which is rotatable about a longitudinal axis.

Provision may further be made for the input part to be movable into the input position and/or the housing position by means of the or one of the switching cam(s), and/or for the further rearwardly arranged housing part to be fixable in the elongated position and/or shortened position by means of the or the other switching cam.

The movable input part may, in particular via its end region opposing the input element, be fastened in the housing, in particular on the cam part, preferably in a form-fitting and/or frictionally-locking manner, in particular by means of a snap-fit connection. Alternatively or additionally, the input part may, in particular via its end region opposing the input element, be releasably or rigidly connected in the housing to a component of the input device, in particular to the cam part, preferably by means of a form fit and/or friction fit, in particular a snap-fit connection.

In order to guarantee that the above-described distance to the front end of the input element is provided in the input state of the input device, the input device may have a spacer part, which is preferably not movable relative to the housing, on which the spring element is supported and which ensures the distance from the spring element to the front opening of the housing, in particular a spacer part having a rear end which is preferably a rear end projecting into a front cavity of the cam part and on which a front end of the spring element rests.

The spacer part may have a portion with a cavity, through which the input part is guided, in particular a hollow cylindrical portion. The rear end of the spacer part, on which the front end of the spring element rests, may be formed by a rear, free end of this portion.

At the front end, the housing may further have a cap-like housing part, which has in particular the opening of the housing and in which the spacer part is entirely or partly arranged, in particular via a housing part screwed to an adjacent housing part.

In a front region, the spacer part may be connected to the cap-like housing part, in particular integrally or as a single material unit. The former may also be supported in a front region on the cap-like housing part.

The rear end of the spring element may be supported on the control unit, in particular on the cam part of the control unit, in particular by bearing against the control unit or the cam part of the control unit.

The internal diameter of the front opening of the housing, in particular of the cap-like housing part, and the maximum diameter of the input part may preferably be adapted to each other in such a way that the input part can be guided through this opening during assembly of the input device.

With regard to the input part, it may have at its rear end or in the region of its rear end a connecting element of the snap-fit connection, this connecting element being connected in at least a form-fitting manner during assembly to a matching counterpart, arranged in particular on the cam part, of the snap-fit connection.

Further features of the present invention will become apparent from the appended patent claims, from the description of a preferred exemplary embodiment that follows, and from the appended drawing.

In the drawing:

FIG. 1 shows a longitudinal section through an input device according to the invention.

The input device 10 according to FIG. 1 is what is known as an EMR stylus for a touch-sensitive screen (not shown), the input technology of which is based in a manner known per se on electromagnetic resonance or, more specifically, on magnetic fields which are generated by the screen and with which a resonator circuit of the input device 10 interacts. It goes without saying that the invention is not limited to such a stylus, which is described in greater detail in the following, but, rather, that the invention also encompasses all other active or passive stylus devices.

In the front region, the input device 10 has an elongate, movably mounted input part 11, which in the present case is an EMR nib and which has, at the front end, an input element 12 which can be placed on the screen and has an input surface 13. Such an input element 12 is also referred to as an input tip, wherein it goes without saying that the input element 12 does not have to taper to a tip in the literal sense, but may rather, for example, also have a rounded input surface 13, as in the present case.

The input device 10 further has an elongate housing 14, which can be gripped by a user when using the input device 10. Located within the housing 14 (not shown) are, inter alia, the components required for interacting with the touch-sensitive screen, such as an electronic assembly with a resonator circuit comprising a resonator coil. In the present case, one or more or all of these components are constituent parts of the input part 11 or the EMR nib.

FIG. 1 shows the input device 10 in an elongated use state, in which the input device can be gripped by a user for inputs on the touch-sensitive screen and used for making inputs.

At the front end, the housing 14 of the input device 10 has a front housing part 15 with a cap-like housing part 16, which is arranged at the front end and has an opening 17, through which the input part 11 extends in the elongated state in FIG. 1, so that the input element 12 is accordingly located outside the housing 14 for placement on the screen. In the present case, the cap-like housing part 16 is releasably connected, in the present case by means of a screw connection, to a further rearwardly arranged (hollow) cylindrical housing portion 26 of the front housing part 15.

In this state, the input part 11 is in a temporarily fixed or locked position and is held in place by the lock against the spring force of a spring element 18, which is a compression spring in the present case.

At the rear end, the housing 14 has a rear, movable housing part 19, which serves as a depressor and consequently represents an extension of the housing 14 in the state shown. The rear housing part 19 is held in the position shown in FIG. 1 by the spring force of a further spring element 20, which is likewise a compression spring in the present case.

The input device 10 can be transferred from the elongated use state shown to a shortened (transport) state (not shown), in which the input element 12 is then located within the housing 14, namely in the present case within the cap part 16, and in which the rear housing part 19 is no longer in the extended position shown in FIG. 1, but is rather in a retracted position in which it is located at least partly within the front housing part 15.

In order to transfer the input device from the elongated use state to the shortened state, it is necessary for a user, generally while simultaneously holding the front housing part 15 securely, to move the rear housing part 19 relative to the front housing part 15, specifically by press-actuating the rear housing part 19 in the direction of the arrow shown in FIG. 1 or forward. This press-actuation comprises pressing, or pressing on, the rear housing part 19 in the direction of the front end of the input device, with the result that this rear housing part is pushed (at least partly) into the front end of the input device. At the end of the movement, the rear housing part 19 is then held in a or its retracted position or fixed/locked in this retracted position against the spring force of the spring element 20.

By moving/pressing the rear housing part 19 relative to the front housing part 15 as mentioned above, the input part 11 is also simultaneously or synchronously released from the lock in its input position, and the input part 11 is subsequently moved rearward into the interior of the housing 14 or the cap-like housing part 16 by the spring force of the spring element 18. This is described in greater detail in the following.

By press-actuating the rear housing part 19 analogously in the direction of the arrow, the input device 10 can moreover also be transferred from the shortened state back to the extended state.

In order to achieve the functions mentioned, the input device 10 has a control unit 21, to which, in particular, the rear housing part 19 and the input part 11 are operatively connected.

In the present case, the control unit 21 has a switching sleeve 22, which is connected to the housing 14 in an axially fixed and rotationally engaged manner, and a (in the present case hollow-body-shaped) cam part 23, which cooperates with the switching sleeve 22, is rotated or rotatable about a longitudinal axis when the rear housing part 19 is press-actuated and, in the present case, has two switching cams (not shown).

Firstly, a rear end of the input part 11 is connected to the cam part 23, in particular in a form-fitting manner, in the present case by means of a snap-fit connection 27. It goes without saying that other connection types may also be used. Secondly, the rear housing part 19 is mounted or guided on the cam part 23 so as to be movable in the longitudinal or axial direction.

A suitable coupling element 24, namely, in the present case, a pin connected to the switching sleeve 22, engages in the first, in particular heart-shaped, switching cam of the cam part 23. In the input position of the input part 11 shown in FIG. 1, the coupling element 24 is in a locking position within the first switching cam, thereby axially securing the cam part 23 and, together therewith, the input part 11 fastened thereto, against the spring force of the spring element 18 in the respective position.

When the rear housing part 19, in its extended position, is press-actuated by an operator, the rear housing part 19 is initially moved axially forward or in the direction of the arrow. This frees the coupling element 24 (with rotation of the cam part 23) from its locking position, so that the cam part 23, together with the input part 11, is subsequently moved axially in the opposite direction, i.e. against the direction of the arrow, in the housing 14 by the spring force of the spring element 18 and, as a result, the input part 11 is moved from the input position into the housing position.

In the interior of the front housing part 15, the rear housing part 19 is then axially secured, in its now retracted position, against being extended outward again as a result of spring force, in that in this position a further coupling element (not shown), which is connected in particular to the rear housing part and cooperates with the second switching cam, in the present case a T-shaped switching cam, arranged axially after the first switching cam, is then in a locking position.

In order finally to transfer the input device 10 from the shortened (transport) state back to the extended use state, the rear housing part 19, when the latter is in the retracted position, is moved in the direction of the arrow and, in this process, with the lock on the rear housing part 19 simultaneously being lifted, the cam part 23 is moved together with the input part 11 in the direction of the arrow until the input part 11 is again in the input position and is locked there again in cooperation with the cam part 23 or the first switching cam. Due to the lock on the rear housing part 19 being lifted, after the end of the press-actuation procedure or when the rear housing part 19 is released, the rear housing part 19 is finally moved back into the extended position by the spring element 20 in the opposite direction or against the direction of the arrow.

As a person skilled in the art will recognize, the aforementioned functions could also be implemented using alternative techniques.

A further special feature of the present invention is that the spring element 18 is arranged in the housing 14 at a distance from the front, free end of the input device 10 or also at a distance from the front opening 17 of the housing 14.

When the input part 11 is in the input position, the front end of the spring element 18 is at a distance of at least 15 mm from the front end of the input element 12, preferably at least 20 mm, particularly preferably at least 22 mm.

It has been found that, if the spring element 18 is metallic, the aforementioned distance ensures that magnetic and/or electromagnetic interference affecting the input element 12 constructed as an EMR tip is reduced or even avoided entirely.

As an alternative or in addition to the (possibly further) reduction in/prevention of such interference, provision may be made, with the exception of the input part 11, to which such an obligatory requirement does not apply and which accordingly may be entirely or partly constructed from metallic and/or non-metallic material, for all other components of the input device 10 and/or the component portions of all other components of the input device 10 which, when the input part 11 is in the input position, are located in a region of at least up to 15 mm, preferably at least 20 mm, particularly preferably at least 22 mm, starting from the front end of the input element 12, to be constructed from non-metallic material.

Alternatively or in addition, provision may be made for at least the cap-like housing part 16 and/or the spring element 18 and/or the spacer part 25 to be constructed from non-metallic material (in particular plastic material).

The above-mentioned distance from the front end of the spring element 18 to the front end of the input element 12 is moreover achieved in the present case in that the front end of the spring element 18 is supported or rests on a spacer part 25.

This spacer part 25 is arranged centrally in the cap part 16 or is formed by the latter, in that the former is connected to the cap part 16 integrally and/or as a single material unit or is a constituent part thereof forming a single material unit therewith.

The spacer part 25 has a hollow cylindrical portion 25 *a*, which directly adjoins the opening 17 and through which the input part 11 is guided, the front end of the spring element 18 resting or bearing against the rear free end of this hollow cylindrical portion.

As is apparent, the rear end of the spring element 18 is supported on a (in the present case radial) wall of the cam part 23, by bearing against this wall.

LIST OF REFERENCE SIGNS

10 Input device
11 Input part
12 Input element
13 Input surface
14 Housing
15 Front housing pert
16 Cap-like housing pert
17 Opening
18 Spring element—front housing pert
19 Rear housing part
20 Spring element—depressor
21 Control unit
22 Switching sleeve
23 Cam part
24 Coupling element
25 Spacer part
25 *a* Portion—spacer part
26 Housing portion—front housing part
27 Snap-fit connection

The invention claimed is:

1. An input device which is intended for a touch-sensitive screen and to a front end of which an input element, which can be placed on the screen, of an input part of the input device is assigned in order to make inputs, wherein the input part is movably mounted so that the input part is movable from a housing position, in which the input element is located in a housing of the input device, into an input position, in which the input element is located outside the housing, in order to make inputs, wherein, in order to elongate the input device, a further rearwardly arranged housing part of the housing is movably mounted on a further forwardly arranged housing part of the housing, so that the further rearwardly arranged housing part is movable from a shortened position, in which the input device is shortened, into an elongated position, in which the input device is elongated, wherein in the housing a spring element is arranged, with or against a spring force of which the input part is movable from the housing position into the input position, and wherein, when the input part is in the input position, a front end of the spring element is located at a distance of at least 15 mm from the front end of the input element.

2. The input device as claimed in claim 1, wherein the input device is an electromagnetic, electro-optical, EMR, capacitive, inductive or resistive stylus.

3. The input device as claimed in claim 1, wherein the spring element is arranged in the housing at a distance from the front, free end of the input device and/or wherein the spring element is arranged at a distance from a front opening of the housing, the input element being moved through the opening when the input part is moved from the housing position into the input position.

4. The input device as claimed in claim 1, wherein the spring element is a tension or compression spring.

5. The input device as claimed in claim 1, wherein the input device has a control unit, with which the input part is movable both from the housing position into the input position and from the input position into the housing position.

6. The input device as claimed in claim 1, wherein the further rearwardly arranged housing part is movable into the elongated position by a spring force of a second spring element.

7. The input device as claimed in claim 6, wherein the further rearwardly arranged housing part is a depressor which is operatively connected to a control unit and can be actuated in a same pressing direction to move the input part both into the input position and into the housing position.

8. The input device as claimed in claim 7, wherein the control unit is constructed and is operatively connected to the further rearwardly arranged housing part in such a way that a single actuation of the further rearwardly arranged housing part in the pressing direction moves the input part from the housing position into the input position and also moves the further rearwardly arranged housing part from the shortened position into the elongated position.

9. The input device as claimed in claim 5, wherein the control unit has a switching sleeve, which is connected in particular to the housing in an axially fixed and rotationally engaged manner, and a cam part which cooperates with the switching sleeve.

10. The input device as claimed in claim 1, wherein the input part is fastened in the housing.

11. The input device as claimed in claim 3, wherein the input device has a spacer part on which the spring element is supported and which ensures the distance from the spring element to the front opening of the housing.

12. The input device as claimed in claim 11, wherein the spacer part has a portion with a cavity, through which the input part is guided, and wherein a rear end of the spacer part, on which the front end of the spring element rests, is formed by a rear, free end of the portion.

13. The input device as claimed in claim 11, wherein, at the front end, the housing has a cap-like housing part, which has the opening of the housing and in which the spacer part is entirely or partly arranged.

14. The input device as claimed in claim 13, wherein, in a front region, the spacer part is connected to the cap-like housing part integrally or as a single material unit, or wherein, in a front region, the spacer part is supported on the cap-like housing part.

15. The input device as claimed in claim 11, wherein a rear end of the spring element is supported on a control unit.

16. The input device as claimed in claim 3, wherein an internal diameter of the front opening of the housing and a maximum diameter of the input part are adapted to each other in such a way that the input part can be guided through this opening during assembly of the input device.

17. The input device as claimed in claim 10, wherein the input part has at a rear end or in a region of the rear end a connecting element of a snap-fit connection, the connecting element being connected in at least a form-fitting manner during assembly to a matching counterpart, arranged on a cam part, of the snap-fit connection.

18. The input device as claimed in claim 1, wherein, with the exception of the input part, which may be entirely or partly constructed from metallic and/or non-metallic material, all other components of the input device and/or the component portions of all other components of the input device which, when the input part is in the input position, are located in a region of at least up to 15 mm, starting from the front end of the input element of the input part, are constructed from non-metallic material.

19. The input device as claimed in claim 1, wherein at least a cap-like housing part and/or the spring element and/or a spacer part is or are constructed from non-metallic material.

* * * * *